United States Patent [19]

Fernley et al.

[11] 4,088,594

[45] May 9, 1978

[54] STABILIZED DETERGENT COMPOSITIONS

[75] Inventors: George W. Fernley; Gerdina J. R. Daane nee Pluim, both of Amsterdam, Netherlands

[73] Assignee: Shell Oil Company, Houston, Tex.

[21] Appl. No.: 749,493

[22] Filed: Dec. 10, 1976

[30] Foreign Application Priority Data

Dec. 19, 1975 United Kingdom ............... 52101/75

[51] Int. Cl.$^2$ ......................... C11D 1/68; C11D 3/20; C11D 17/08; C09K 15/08

[52] U.S. Cl. .................................... 252/89 R; 252/99; 252/135; 252/404; 252/407; 252/DIG. 1; 252/DIG. 14

[58] Field of Search ................... 252/89, 99, 135, 156, 252/404, 407, DIG. 1, DIG. 14

[56] References Cited

U.S. PATENT DOCUMENTS

| | | | |
|---|---|---|---|
| 2,658,923 | 11/1953 | Fischer | 260/632.5 |
| 2,706,189 | 4/1955 | Pruitt | 260/45.95 |
| 2,786,080 | 3/1957 | Patton | 260/611.5 |
| 3,369,304 | 2/1968 | Clark | 34/9 |
| 3,580,850 | 5/1971 | Dupre | 252/99 |

FOREIGN PATENT DOCUMENTS

| | | | |
|---|---|---|---|
| 1,159,478 | 7/1969 | United Kingdom | 252/89 |

*Primary Examiner*—Dennis L. Albrecht

[57] ABSTRACT

Alcohol ethoxylate type non-ionic surfactants are stabilized against storage and transport degradation by the addition thereto of alkylidene bisphenols.

4 Claims, No Drawings

STABILIZED DETERGENT COMPOSITIONS

BACKGROUND OF THE INVENTION

Field of the Invention

This invention is concerned with stabilizing alkyl polyoxyalkylene ether non-ionic surfactants by addition thereto of alkylidene bisphenols.

The Prior Art

Alkyl polyoxyalkylene ether non-ionic surfactants are well-known surfactants and are generally replacing alkyl aryl polyoxyalkylene surfactants in view of their superior biodegradability properties. However, a problem of these surfactants is their instability during storage which is evidenced by a carbonyl content build-up. One means of overcoming this problem is to store and transport the surfactants, usually as 100% active material (a.m.) liquids or aqueous solutions (e.g. 25 to 90% a.m.) thereof under a nitrogen blanket. However, this is an expensive and troublesome solution to the problem.

The prior art in this area is: British Patent 1,159,478 published July 23, 1969, which discloses the addition of bisphenol A to built compositions containing alcohol-ethoxylates in order to reduce smoke formation during the spray-drying thereof; U.S. Pat. No. 3,369,304, issued Feb. 20, 1968, which discloses the addition of alkylated bisphenols to alcohol ethoxylates to prevent the degradation thereof during spray-drying at temperatures above 100° C; U.S. Pat. No. 2,658,923, issued Nov. 10, 1953, which discloses the addition of bisphenol A to "oxo" alcohols; and U.S. Pat. No. 2,706,189, issued Apr. 12, 1955, which disclosed the addition of bisphenol A to solid propylene oxide polymers.

STATEMENT OF THE INVENTION

The stability during storage of alkyl polyoxyalkylene ether non-ionic surfactants is significantly improved by adding small amounts of alkylidene bisphenols thereto. This invention also covers an improved method of adding the alkylidene bisphenols to the alkyl polyoxyalkylene ether non-ionic surfactants. In this improved process, from 10–100%w of the bisphenol additive is first dissolved in the surfactant. This intermediate composition is a liquid having an extremely low pour point and thus can be more easily mixed with further quantities of the surfactant to produce the stabilized surfactant product. This process is easier and more convenient than trying to dissolve small amounts of bisphenol additives which are solids, even at high temperatures, in the surfactant.

Description of the Preferred Embodiments

According to the present invention an unbuilt stabilized detergent composition comprises:

(a) an alkyl polyoxyalkylene ether non-ionic surfactant, (b) an additive of general formula:

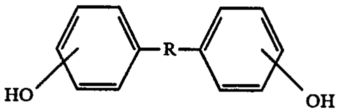

(I)

wherein R is a $C_{1-6}$ alkylidiene group, and (c) optionally water.

An advantage of the additives of general formula I is that, in addition to reducing the carbonyl content build-up of the stored surfactant, they do not adversely effect the color thereof.

Suitable alkyl polyoxyalkylene ether non-ionic surfactants may be represented by the following general formula:

$$R\text{-}O\text{-}(C_nH_{2n}\text{—}O)_mH$$

wherein R is a $C_6$ to $C_{20}$ alkyl radical, $n$ is 2 or 3, and $m$ is from 2 to 25.

Particularly suitable surfactants are those of the above formula wherein R is a $C_9$ to $C_{15}$ alkyl radical, $n$ is 2 and $m$ is from 3 to 20. The surfactants are prepared by reacting an alcohol with alkylene oxide and suitable alcohols include primary and secondary alcohols with the former being particularly suitable. Preferred alcohols are those derived from an olefin or a mixture of olefins by hydroformylation. Such alcohols usually have from 10 to 60% of branching (methyl or ethyl groups) on the beta-carbon atoms thereof. Suitably such alcohols are ethoxylated so that, on average, from 3 to 20 moles of ethylene oxide react with each mole of alcohol. The term alkyl polyoxyalkylene ether as used herein includes any by-products formed e.g. polyethylene glycols or unreacted material (e.g. alcohols) present in the alkoxylation product. The surfactants are usually liquid materials at below 50° C and they are stored and transported as liquid materials.

Suitable additives of general formula I are those in which the hydroxy groups are in the para-positions with respect to the alkylidene groups. Suitable additives include 4,4'-isopropylidenebisphenol (bisphenol A), 4,4'-methylidene bisphenol, 4,4'-ethylidene bisphenol and 4,4'-butylidene bisphenol. Bisphenol A is the preferred additive. Preferred amounts of additives are in the range of from about 0.01 to about 2%w, preferably from about 0.05 to about 1%w, based on the amount of ether surfactant. These amounts correspond to ranges of from 100 to 20,000 parts, and from 500 to 10,000 parts, per million parts of ether surfactant. However, compositions containing from 10 to 100%w of additive are also useful compositions as will be described below.

As stated herein before the compositions are unbuilt compositions which means that the compositions are substantially free of the conventional detergent builders such as phosphates and silicates. Usually the compositions to be stored or transported will not contain components other than the ether surfactant, additive and optionally water. Consequently, the amount of these components will total 100%w of the total composition. Water if present is usually present in an amount of from 10 to 75%w based on total composition.

The present invention is also concerned with a process for stabilizing an unbuilt detergent composition which comprises adding to an alkyl polyoxyalkylene ether non-ionic surfactant, or an aqueous solution thereof, in the absence of a builder, an additive of general formula I in an amount of from 100 to 20,000 parts per million parts of the ether surfactant. Since the additives are solids, even at high temperatures, e.g. of above 100° C, and since only a small amount thereof is present in the compositions it is necessary to heat and to stir vigorously the mixture for a long period in order to dissolve the additives and to ensure an equal distribution thereof throughout the surfactant. However, this problem may be overcome if a concentrate of the additive in the surfactant is formed first, followed by the mixing of this concentrate, with further amounts of the surfactant. It has surprisingly been found that such concentrates, particularly those comprising from 10 to 100%w, preferably from 20 to 100%w, of the additive are liquids having extremely low pour points and are therefore easy to mix with further quantities of the surfactant.

Accordingly, the present invention is also concerned with a process for preparing the composition of this invention, comprising mixing a concentrate comprising the surfactant and the additive, wherein the amount of the additive is from 10 to 100%w, based on the weight of surfactant in the concentrate, with a further amount of surfactant.

The invention will not be illustrated with reference to the following examples which are provided for illustration and are not to be construed as limiting the invention.

EXAMPLES I to III 4,4'Isopropylidenebisphenol (bisphenol A) was added, in the amounts specified in Table I, to NEODOL® 25-7EO (a non-ionic surfactant prepared by reacting, on average, 7 moles of ethylene oxide with 1 mole of a mixture of primary $C_{12}$ to $C_{15}$ hydroformylation alcohols which is about 30% branched in the beta-position).

The resulting compositions were then subjected to an artificial long-storage test which comprised heating 20 ml of the compositions, in an oil bath in the presence of atmospheric oxygen, for 5.5 hours at 125° C. The carbonyl content before and after storage was determined colorimetrically using 2,4-di-nitro-phenylhydrazine. The change in color was also measured using the Hazen scale with a 12 mm cell.

The results are given in Table I.

For comparison the results obtained using NEODOL 25-7EO alone in combination with a conventional anti-oxidant, 2,2-bis(4-hydroxy-3,5-di-tert-butylphenyl) propane (IONOX® 400) are given in table I.

TABLE I

| Example | Surfactant | Additive *% w | Carbonyl value (ppm) before | Carbonyl value (ppm) after | Color before | Color after |
|---|---|---|---|---|---|---|
| — | NEODOL 25-7EO | — | 20 | 190 | <5 | <5 |
| I | " | Bisphenol A (0.1) | 20 | 70 | <5 | <5 |
| II | " | Bisphenol A (1.25) | 20 | 60 | <5 | <5 |
| III | " | Bisphenol A (0.5) | 20 | 60 | <5 | <5 |
| — | " | IONOX 400 (0.1) | 20 | 30 | <5 | 40 |

*based on weight of NEODOL 25-7EO

The table shows that bisphenol A is not only effective in reducing the carbonyl content of the surfactant but is also effective in preventing discoloration of the surfactant.

EXAMPLES IV to X

Various concentrates of Bisphenol A in NEODOL 25-7EO were prepared and the pour points thereof determined according to ASTM D 97. The results are given in Table II from which it can be seen that the concentrates, particularly those containing more than 20%w of Bisphenol A, have extremely low pour points. The concentrates thus prepared were added to further quantities of NEODOL 25-7 to product compositions comprising 0.1%w of Bisphenol A.

Attempts to prepare similar compositions but using, instead of Bisphenol A, other anti-oxidants such as IONOX® 400, IONOL® CP (2,6-di-tertiary-butyl-4-methylphenol) and IRGANOX® 1010 (pentaery-thrityl-tetrakis [3-3(3,5-di-tertiary-butyl-4-hydroxyphenyl)-propionate]) were not successful since these amounts of the antioxidants would not dissolve in NEODOL 25-7EO.

TABLE II

| Example | % w of Bisphenol A based on weight of NEODOL 25-7EO | Pour Point (° C) |
|---|---|---|
| — | — | 20[1] |
| IV | 11.1 | 11 |
| V | 25 | 2 |
| VI | 33.3 | − 7 |
| VII | 42.9 | − 7 |
| VIII | 53.9 | −10 |
| IX | 66.7 | −13 |
| X | 81.8 | −10 |
| — | — | 153.5[2] |

[1]pour point of NEODOL 25-7EO
[2]melting point of "Bisphenol" A

What is claimed is:

1. A detergent concentrate comprising:

(a) an alkyl polyoxyalkylene ether non-ionic surfactant, and (b) from about 10 to about 100 percent by weight based on (a) of an additive of the general formula:

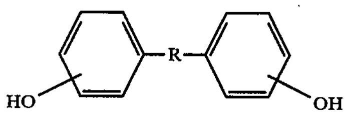

wherein R is a $C_1$ to $C_6$ alkylidene group

2. The concentrate of claim 1 wherein the additive (b) ranges from about 20 to about 100 percent by weight based on (a).

3. A process for preparing an unbuilt stabilized composition comprising:

(a) an alkyl polyoxyalkylene ether non-ionic surfactant;

(b) an additive of general formula:

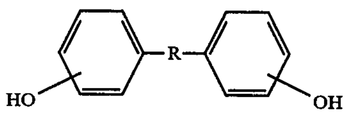

wherein R is a $C_1$ to $C_6$ alkylidene group and the amount of (b) is from about 0.01 to about 2 percent by weight based on the weight of (a); and (c) the balance being water with the weight of the water ranging from about 0 to about 70 percent by weight based on the total composition;

said process comprising first mixing a concentrate containing (a) and (b), wherein the amount of (b) is from 10 to 100%w, based on the weight of (a) in the concentrate and then mixing a sufficient amount of (a) and (c) in order to produce said composition.

4. The process of claim 3 wherein the concentrate contains from 20 to 100%w of (b), based on the amount of (a) in the concentrate.

* * * * *